United States Patent
Murray et al.

(10) Patent No.: US 6,935,253 B2
(45) Date of Patent: Aug. 30, 2005

(54) DEPTH CONTROL FOR SEED PLANTER

(75) Inventors: Timothy Allen Murray, Spirit Lake, IA (US); Aaron Oral Disrud, Fergus Falls, MN (US); Nicholas Dean Pederson, Kennewick, WA (US); Daniel John Huwe, Plattsmouth, NE (US)

(73) Assignee: CNH America LLC, Racine, WI (US)

( * ) Notice: Subject to any disclaimer, the term of this patent is extended or adjusted under 35 U.S.C. 154(b) by 108 days.

(21) Appl. No.: 10/704,388

(22) Filed: Nov. 7, 2003

(65) Prior Publication Data

US 2005/0098076 A1 May 12, 2005

(51) Int. Cl.⁷ ................................................ A01C 5/00
(52) U.S. Cl. ...................................................... 111/135
(58) Field of Search ......................... 111/69, 134–137, 111/163, 164, 168, 200, 192, 193; 172/547, 558–566, 610, 734–739, 748, 762

(56) References Cited

U.S. PATENT DOCUMENTS

| | | |
|---|---|---|
| 4,116,140 A | 9/1978 | Anderson et al. |
| 4,355,688 A | 10/1982 | Hamm et al. |
| 4,374,500 A | 2/1983 | Westerfield |
| 5,427,038 A * | 6/1995 | Ege ............................. 111/137 |
| 5,829,535 A | 11/1998 | Line |
| 5,934,208 A | 8/1999 | Clemons |
| 6,386,127 B1 | 5/2002 | Prairie et al. |
| 6,752,094 B1 * | 6/2004 | Truax ......................... 111/135 |

* cited by examiner

Primary Examiner—Robert E Pezzuto
(74) Attorney, Agent, or Firm—Rebecca Henkel; Brant T. Maurer (57) ABSTRACT

A disc opener assembly connected to a tool bar linked to a vehicle for movement over the ground for opening a seed trench therein, the assembly comprising a main arm member attached to the tool bar, a disc mounted for rotation on the main arm, a gauge arm member having proximal and distal ends, the proximal end mounted for pivotal motion about a pivot axis to the main arm member, a gauge wheel mounted to the distal end of the gauge arm member, a first coupler mounted to the main arm member, a second coupler linked to the gauge arm member and juxtaposed proximate and for movement with respect to the first coupler along a coupling axis that is substantially parallel to the pivot axis, the second coupler configured to engage the first coupler when biased there against and a retainer for maintaining the first and second couplers engaged.

21 Claims, 8 Drawing Sheets

DEPTH CONTROL FOR SEED PLANTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to agricultural planting equipment and more particularly to a disc opener assembly for a seed planter.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Efficient crop growth requires that seed be planted in different manners that depend at least in part upon soil conditions, fertilizer employed, seed type and anticipated weather and sun exposure conditions. To this end, a seed planter trench opener disc must be capable of opening a seed trench to a selected depth and accurately placing seeds therein to assure that the seed is in proper contact with the soil.

Existing seed planters include various types of depth adjusting mechanisms to control trench depth. One particularly useful type of depth adjusting mechanism provides gauge wheels that, when in a depth adjusting position, have a bottom wheel surface that generally resides proximate and vertically above the bottom disc edge of an associated trenching opener disc. Here, the wheel travels along a field surface and therefore limits disc depth into the soil. In many cases a plurality of disc openers are each independently mounted to a support bar for towing behind a tractor or the like and a separate gauge wheel is mounted to each of the disc openers via an adjustable linkage mechanism so that the vertical height difference (hereinafter "the surface-edge difference") between the bottom wheel surface and the bottom disc edge is adjustable. For instance, an exemplary disc-wheel configuration may be adjustable so that the surface-edge difference can be set to between one and five inches.

Unfortunately, most depth control mechanisms of the type described above have one or more shortcomings. For instance, some depth control mechanisms of the above type have poorly located depth adjustments that make it difficult for an operator to access the adjusting mechanism. Some adjusting mechanisms require an operator to use two hands to adjust disc depth and to assume awkward positions when performing adjustments. Other adjusting mechanisms utilize a threaded shaft which takes a large amount of time to adjust and which has a tendency to seize up due to rust or become bound up due to accumulation of field debris. Still other adjusting mechanisms utilize one or a plurality of nut and bolt pairs to facilitate adjustment—these mechanisms often require two hands and are time consuming to manipulate. Moreover, many mechanisms require a large number of complex components that require small tolerances, are relatively expensive to manufacture and assemble and are expensive to maintain and replace when damaged. Furthermore, some mechanisms are difficult to manipulate as the mechanical advantage afforded by the mechanism designs is less than optimal. In addition, at least some prior mechanisms have increased the width of an associated seeding row unit disadvantageously.

Thus, it would be advantageous to have a seed planter disc opener assembly that provides a conveniently located depth control mechanism, that is operable via one hand, that requires minimal, simple and robust components and that is inexpensive to manufacture, assemble and maintain.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that the shortcomings described above with respect to the known prior art can be overcome by providing a simple cooperating coupler configuration where a moveable coupler moves along a coupling axis to engage and disengage another coupler and where the coupling axis is substantially parallel to a pivot axis of a gauge arm to which a gauge wheel is mounted. In some cases it has also been recognized that a handle member can be provided as a mounting base for the moveable coupler where the handle provides a relatively large mechanical advantage when manipulating the moveable coupler. Here, where the mechanical advantage is appreciable, in at least some cases, the force of a biasing member that biases the moveable coupler toward the other coupler may be increased to provide a more robust design. In addition, in at least some cases, the distance over which a disengaging action may occur can be greater than the distances facilitated by other depth control solutions and therefore the margin for manufacturing error can be increased appreciably and overall costs can be reduced.

Consistent with the above comments, at least some embodiments of the invention include a disc opener assembly connected to a tool bar linked to a vehicle for movement over the ground for opening a seed trench therein, the assembly comprising a main arm member attached to the tool bar, a disc mounted for rotation on the main arm, a gauge arm member having proximal and distal ends, the proximal end mounted for pivotal motion about a pivot axis to the main arm member, a gauge wheel mounted to the distal end of the gauge arm member, a first coupler mounted to one of the main arm member and the gauge arm member, a second coupler linked to one of the main arm member and the gauge arm member and juxtaposed proximate and for movement with respect to the first coupler along a coupling axis that is substantially parallel to the pivot axis, the second coupler configured to engage the first coupler when biased there against and a retainer for maintaining the first and second couplers engaged.

In at least some embodiments the first coupler is mounted to the main arm member and the second coupler is linked to the gauge arm member. The retainer or retainer member may be a biasing member or, in some cases, may be a mechanical latching assembly of some type.

In some cases a limit member may be rigidly mounted to and extending from the gauge arm member, the biasing member positioned between the limit member and the second coupler. Here, in some cases, the gauge arm member will form the limit member (i.e., the limit member will be an extension of the gauge arm member.

Some other embodiments of the invention include a disc opener assembly connected to a tool bar for movement over the ground for opening a trench therein, the assembly comprising a main arm member attached to the tool bar, a disc mounted for rotation on the main arm, a gauge arm member having proximal and distal ends, the proximal end mounted for pivotal motion about a pivot axis to the main arm member, a gauge wheel mounted to the distal end of the gauge arm member, a first coupler mounted to the main arm member, a second coupler linked to the gauge arm member and juxtaposed proximate and for movement with respect to the first coupler along a coupling axis that is substantially parallel to the pivot axis, the second coupler configured to engage the first coupler when biased there against, a biasing member mounted between the gauge arm member and the second coupler for biasing the second coupler toward the first coupler and a handle extending from the second coupler for moving the second coupler away from the first coupler to disengage the first and second couplers.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings and, more specifically, referring to FIG. 1, the present invention will be described in the context of an exemplary agricultural tractor 5 including an agricultural implement attached to a rear end 6 thereof. The implement generally includes a tool bar 7, at least one seed bin 74 and at least one seed planter assembly 10. Tool bar 7 is generally an elongated rigid bar that extends perpendicular to the direction of tractor travel. Bin or Bins 74 are generally mounted above bar 74 while assembly or assemblies 10 are mounted below bar 7 when in an operating position and may be pivoted up into a position generally above bar 7 when in a stowed position for transport or the like. When in the operating position illustrated in FIG. 1, an opening or trenching disc 14 cuts a trench in the ground over which tractor 12 travels as disc is pulled through a field. A gauge wheel 46 rides over the soil there below and limits trench depth as described in greater detail below. The present invention relates to the depth setting mechanism associated with wheel 46.

Herein, while the implement mounted to the rear of tractor 5 may include a plurality of bins 74 and assemblies 10 spaced apart along bar 7 as well known in the art, each of the assemblies and bins would be similarly constructed and operate in a similar fashion and therefore only one of assemblies 10 will be described here in any detail. In addition, it should be recognized that seed planter assemblies 10 like the assemblies described herein may also be used on other types of seeding implements such as larger implements that may be pulled behind a tractor and be supported by separate implement support wheels like a wagon.

Referring now to FIGS. 2 through 7, an exemplary assembly 10 is illustrated in greater detail and includes, generally, a main arm member 12, a gauge a gauge arm member 16, a main arm member extension 17, a disc scraper 18, a seed tube 20, a handle member 24, a first coupler 26, a second coupler 22 and a biasing member 40. Construction and general operation of disc 14, seed tube 20 and gauge wheel 46 are well known in the art and therefore will not be described here in detail. Here, with respect to gauge wheel 46, it should suffice to say that wheel 46 may be made from composite elements, such as a tire rim formed from metal or plastic, connected by a suitable fastener and having a semi-pneumatic tire disposed about its periphery. The semi-pneumatic tire helps reduce side-wall compaction of the seed trench 8 while allowing the gauge wheel 46 to move toward and away from the ground as the depth adjustment mechanism is operated.

Figure 2:
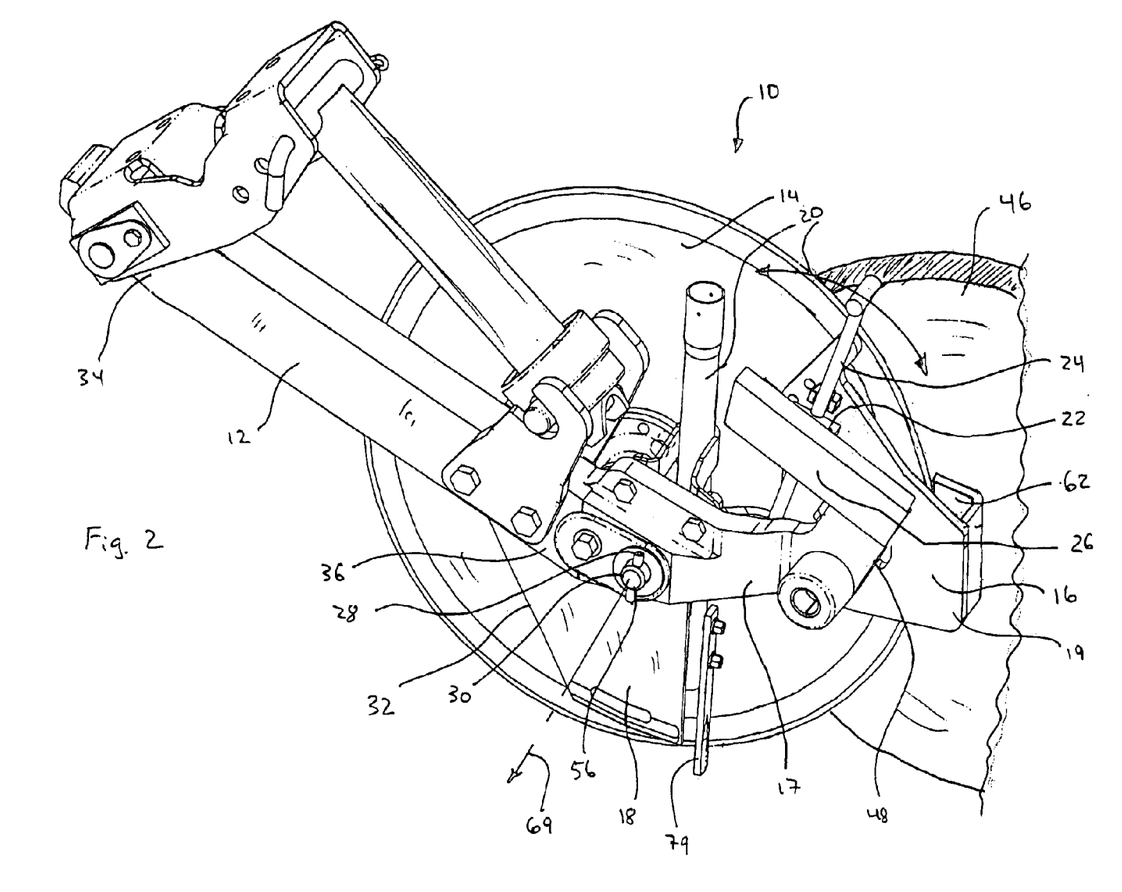
FIG. 2 is a perspective view of depth control assembly of FIG. 1.

With respect to disc scraper 18, here it should suffice to say that scraper 18 is mounted on a scraper mount (not illustrated) attached below main arm member 12 and is aligned with the disc 14 to clean disc 14. Scraper 18 is a planar member with at least one edge 32 that is aligned with the disc 14 and contacts the disc to clean dirt and plant debris from disc 14 as the disc is rotated. The disc scraper 18 is attached to the scraper mount by fasteners or other convenient and conventional means of mounting. Scraper 18 typically is made from steel which has been treated to have a high surface hardness which increases wear resistance.

With respect to seed tube 20, it should suffice to say that tube 20 is a hollow cylindrical member that in linked to the interior of seed receptacle 74 (see FIG. 1) for receiving metered seed from receptacle 74 and depositing the seed into a seed trench formed by disc 14. A deflector tab 79 is mounted to the lower end of seed tube 20. If seed rebounds or deflects from a seed trench 8 there below, the deflector tab 79 redirects the seed back towards the seed trench 8.

Figure 1:
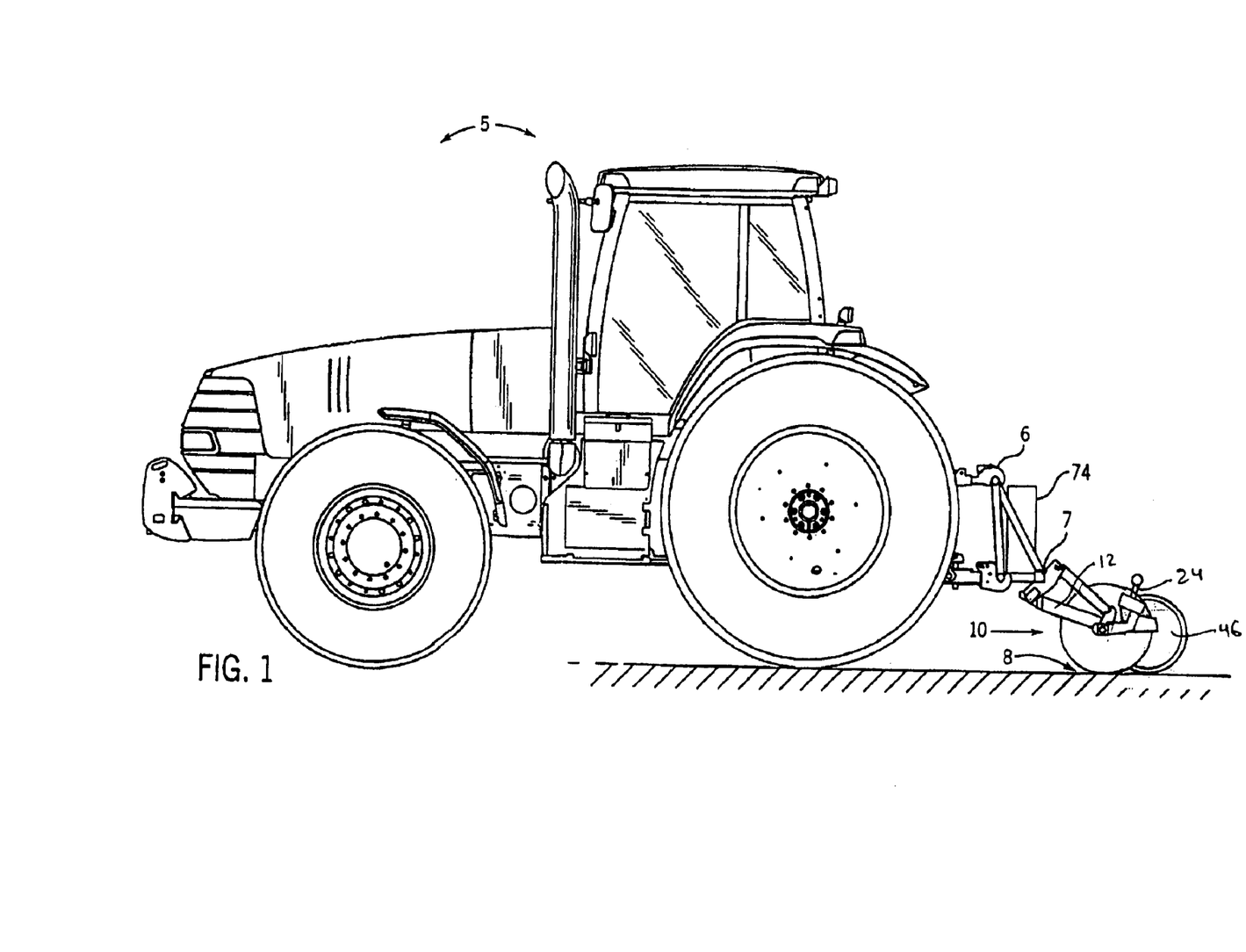
FIG. 1 is a perspective view of a tractor and a seed planting and depth control assembly according to at least one embodiment of the present invention.

Referring now to FIGS. 1 and 2, main arm member 12 includes proximal and distal ends 34 and 36, respectively, the proximal end 34 mounted to tool bar 7 (see again FIG. 1) and the distal end 36 extending generally down and rearward therefrom. Distal end 36 forms two substantially horizontal openings (not labeled) that are used to mount many of the other assembly 10 components. For example, main arm extension 17 is mounted to distal end 36 via the openings and suitable mechanical fasteners (e.g., bolts). In addition, opening disc 14 is rotatably mounted via a forward one of the openings in a fashion well known in the art. As illustrated disc 14 is centrally mounted to the distal end 36 of arm member 12 for rotation along an axis generally perpendicular to the direction of tractor travel. Moreover, gauge arm member 16 is pivotally mounted to a rearward one of the openings. Hereinafter the axis about which the second or rearward opening is formed is referred to as a gauge wheel pivot axis or simply as a pivot axis 69. In at least some embodiments main arm member 12 and extension 17 may be integrally formed such that a first coupler 32 can be said to be located at the distal end of the main arm member.

Figures 7, 9:
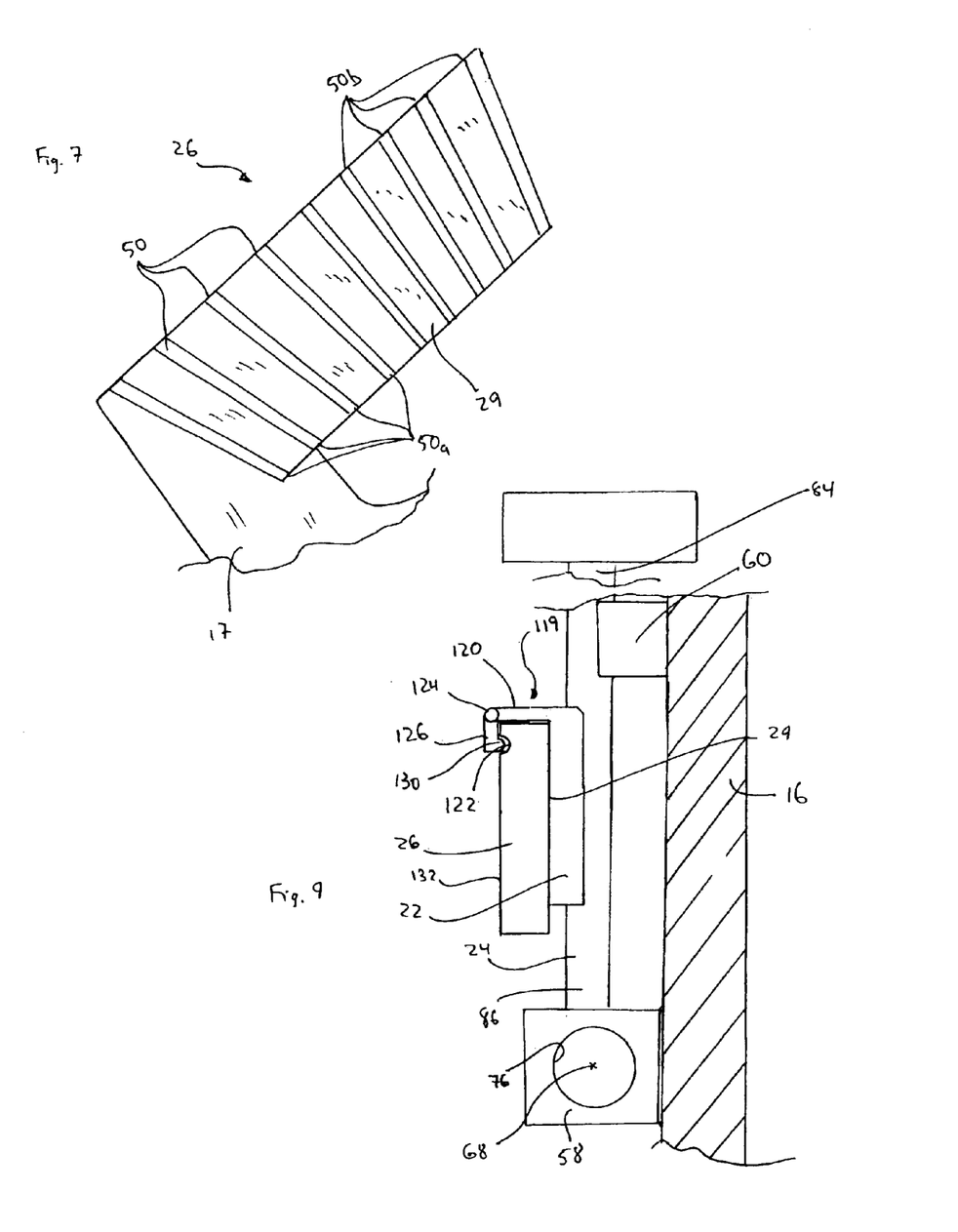
FIG. 7 is a partial plan view of one of the couplers shown in FIG. 5.
FIG. 9 is similar to FIG. 5, albeit illustrating an embodiment of the present invention that does not include a biasing member but, instead, includes a retainer in the form of a latch assembly.

Referring still to FIG. 2, when main arm extension 17 is mounted to the distal end of arm member 12, extension 17 extends generally rearward therefrom and, at a distal end 48, extends upward to a first coupler 26. Referring also to FIG. 7, first coupler 26 is a rigid member including a coupler surface 29 that forms a plurality of teeth or other suitably formed keyed recesses, three of which are collectively identified by numeral 50. In at least some embodiments the teeth are formed in a uniform pattern wherein they generally extend along trajectories that fan out about a central point as illustrated in FIG. 7.

Referring now to FIGS. 3 through 6, gauge arm member 16 is generally a rigid, substantially planar member that has a shape for supporting other components that extend therefrom. In some embodiments member 16 may have some non-planar shape to facilitate unobstructed linkage and relative movement with respect to other assembly 10 components. Member 16 will be described primarily in the context of its orientation in FIG. 3 wherein relative juxtapositions of components are indicated via terms such as below, above, left and right in FIG. 3.

Figure 3:
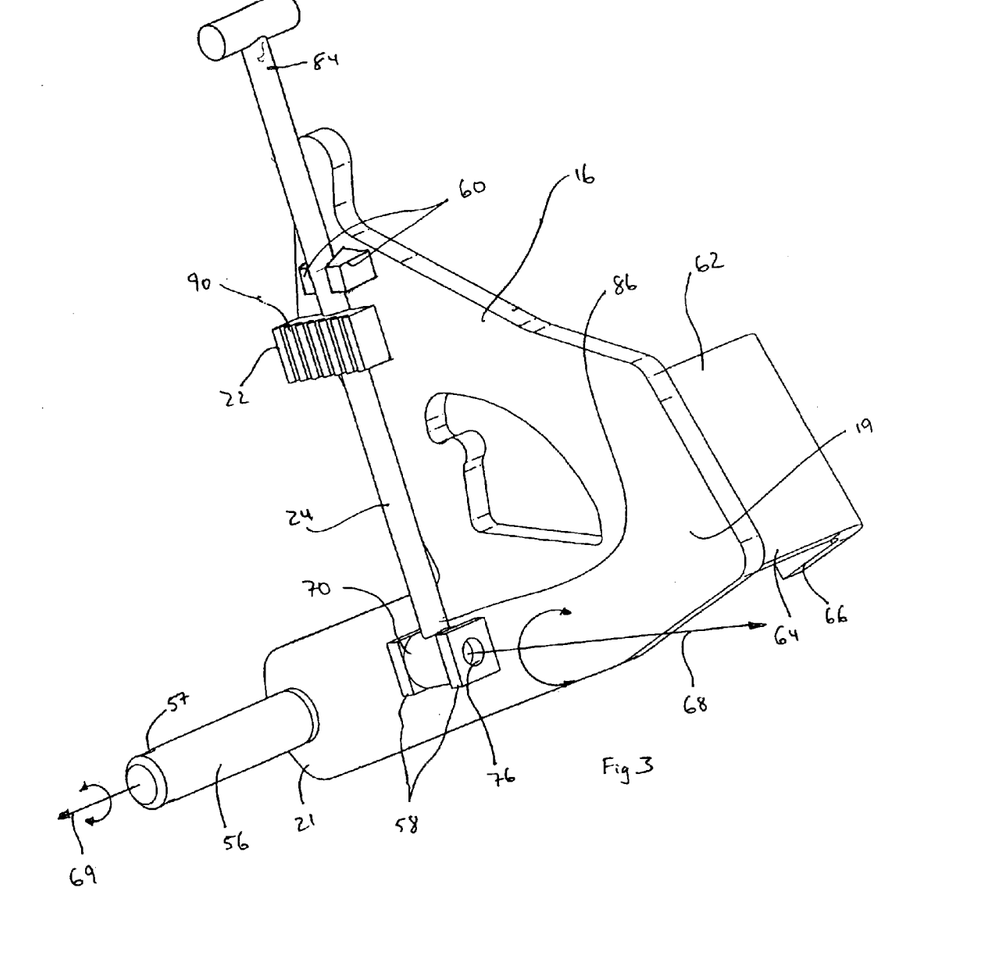
FIG. 3 is a perspective view of a gauge arm member and handle member sub-assembly of FIG. 2.

Referring to FIG. 3, a pivot post 56 extends substantially perpendicular to member 16 from a lower left hand corner thereof. The lower left hand corner is also referred to herein as the proximal end 21 of member 16 as end 21 is mounted to main arm member 12. The end of member 16 opposite proximal end 21 is referred to herein as the distal end 19. A distal end of post 56 forms an opening 57 for receiving a pin 28 to mount and secure post 56 within the second opening formed at the distal end of main arm member 12 (see again FIG. 2).

Figure 4:
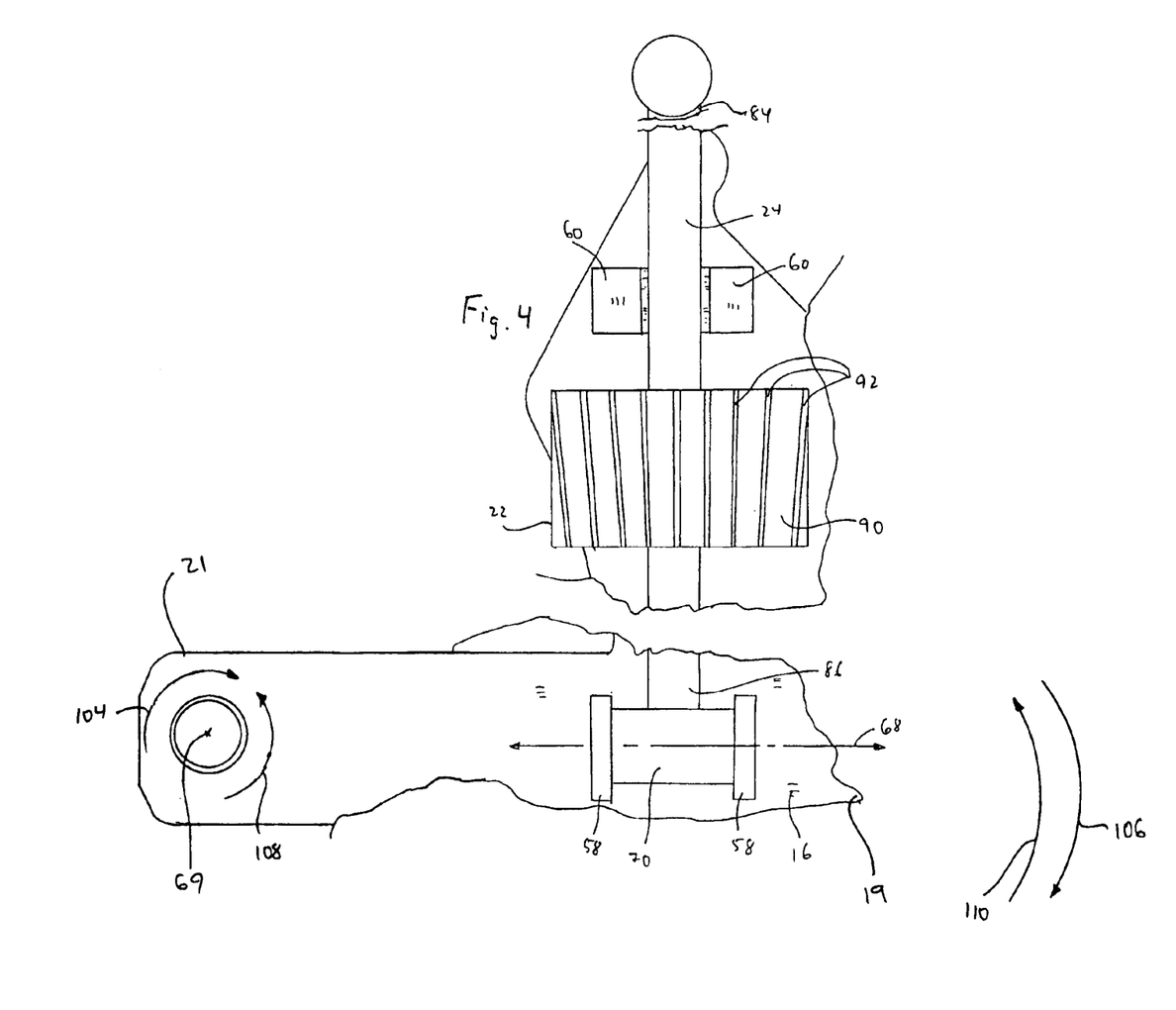
FIG. 4 is a partial plan view of the components of FIG. 3.
Figure 5:
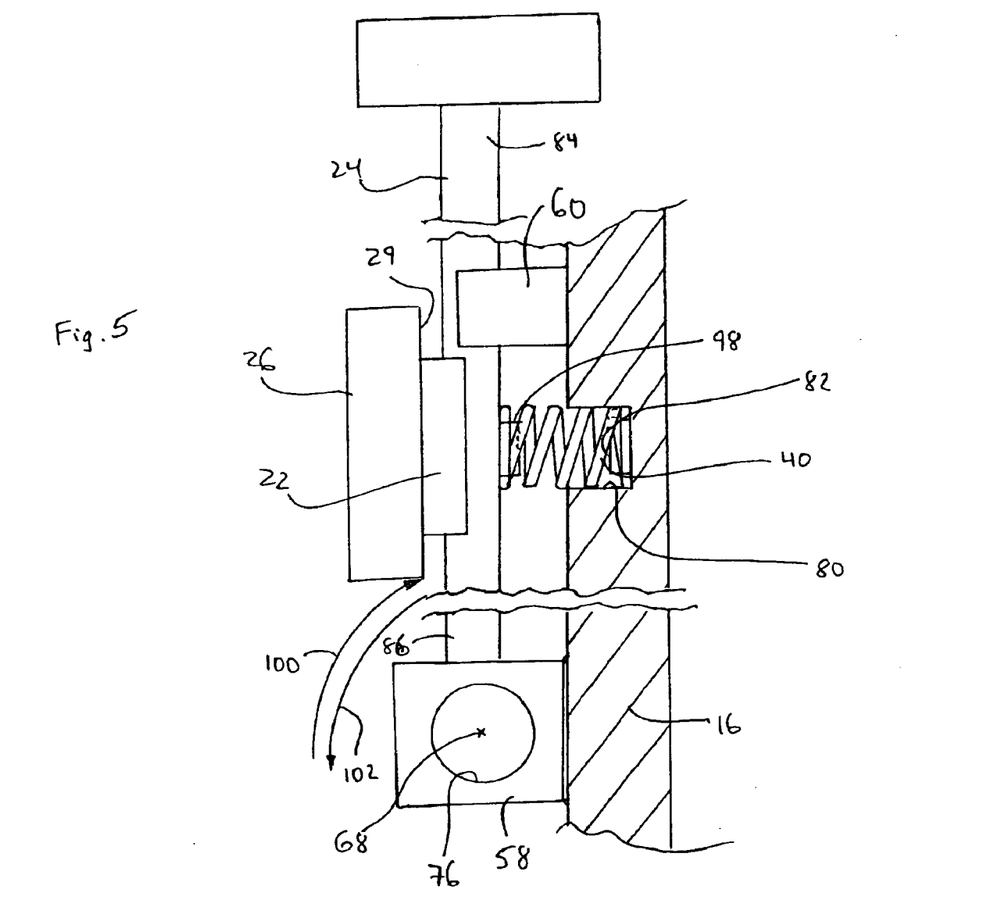
FIG. 5 is a partial cross-sectional view of the components of FIG. 4.

Referring to FIGS. 3 through 5, two mounting member collectively identified by numeral 58 are welded or otherwise integrally secured to member 16 on the same side from which post 56 extends. Members 58 are secured to member 16 approximately midway between the left and right most edges of member 16 and proximate a lower edge of member 16 and are spaced apart so as to form a space for receiving a cylindrically shaped proximal end of handle member 24 therebetween in a lengthwise fashion. In addition, each of members 58 forms an opening 76 (only one illustrated) where the openings 76 are formed about a rotation axis 68 and are aligned to receive a bolt or other suitable mechanical fastener therethrough. Rotation axis 68 is perpendicular to pivot axis 69 as best seen in FIG. 3.

Two guide members collectively identified by numeral 60 are welded or otherwise rigidly secured to and extend form the same side of gauge arm member 16 as post 56. Guide members 60 are positioned above members 58 and such that they form a space therebetween for receiving the shaft of handle member 24. In at least some embodiments the facing surfaces of members 60 may slope toward each other proximate the surface of member 16 so that when the handle shaft is rotated to a position therebetween the shaft is snuggly received therebetween. Here, the surface of gauge arm member 16 and, in some cases, guide members 60, form a limit surface or operate as a limit member for limiting the extent of handle member 24 rotation about axis 68.

Figure 6:
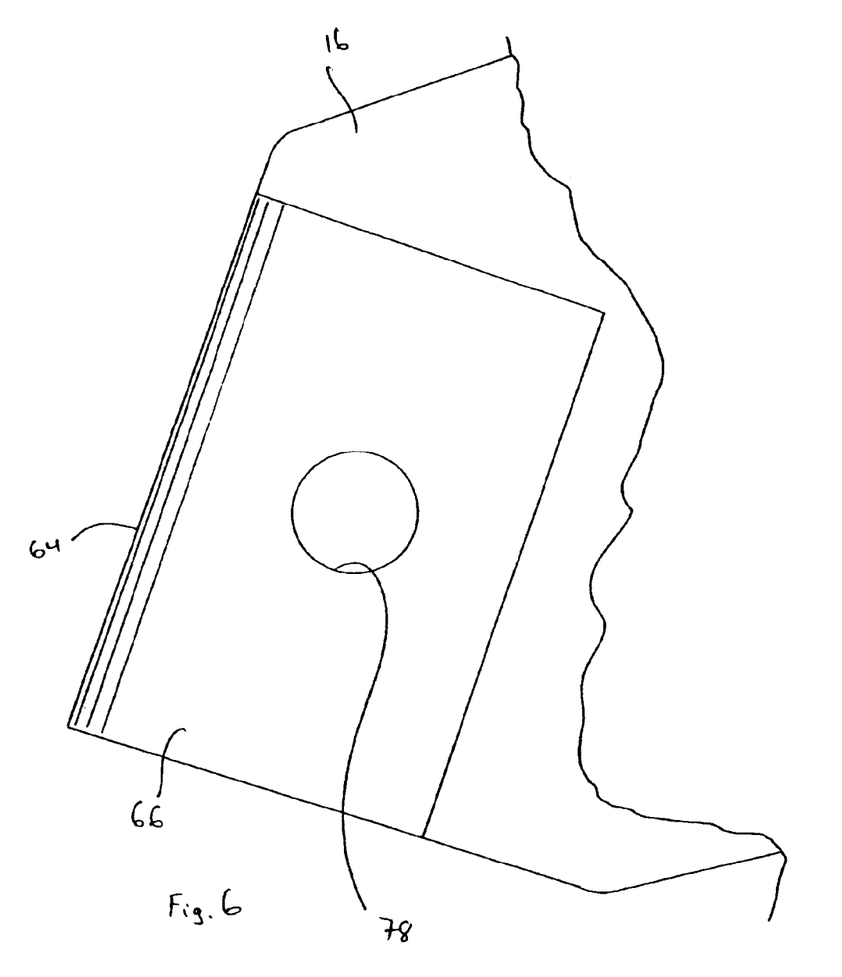
FIG. 6 is a partial perspective view of a gauge wheel mounting member shown in FIGS. 2 and 3.

Referring to FIGS. 1, 2, 3 and 6, a gauge arm extension 62 extends from the distal end 19 of gauge arm member 16 and includes two sub-members. A first sub-member 64 extends perpendicular to member 16 and in a direction opposite the direction in which post 56 extends. A second sub-member 66 extends from a distal end of member 64, substantially parallel to member 64 and generally in the direction of tractor travel (i.e., generally to the right in FIG. 3). As seen in FIG. 6, an opening 78 is formed in second sub-member 66. Gauge wheel 46 is mounted for rotation via a suitable mechanical fastener to opening 78.

Referring to FIG. 5, gauge member 16 forms a recess 80 between members 58 and guide members 60 that, when the proximal end of handle member 24 is mounted between members 58, is aligned with a portion of the shaft of handle member 24 as illustrated. Recess 80 is dimensioned to receive one end of the biasing member or, in the illustrated example, spring 40 therein. In addition, in at least some cases, to help retain a spring within recess 80, a post 82 may be centrally formed within recess 80 so that the end of the spring 40 received within recess 80 is juxtaposed between facing surfaces of the post 82 and recess 80.

Referring to FIGS. 1 through 5, handle member 24 is a rigid elongated member having opposite distal and proximal ends 84 and 86, respectively. Handle member 24 may be many different lengths but, preferably, is long enough that the distal end thereof extends above other assembly 10 components. In at least some embodiments handle 24 will be longer that a foot long. A cylindrical mounting member 70 is provided at proximal end 86. Member 70 has a length dimension (not labeled) that fits within the space defined by the facing surfaces of mounting members 58 and forms an opening (not illustrated) having a radius that is similar to the radius of the openings 76 formed by members 58. To mount handle 24 to gauge arm member 16, mounting member 70 is placed between the facing surfaces of members 58 such that the openings formed thereby are aligned with rotation axis 68. Thereafter a bolt or other suitable mechanical fastener is used to secure the mounting members 70 and 58 such that member 70 can rotate about axis 68.

Referring still to FIGS. 1 through 5, second coupler 22 has a generally block shaped form and is welded or otherwise rigidly secured on one side to the shaft of handle member 24 approximately midway along the length of member 24 and, in at least the illustrated embodiment, between mounting members 58 and guide members 60 when handle member 24 is secured to gauge member 16 as described above. Second coupler 22 includes a coupling surface 90 that, like surface 29, forms a plurality of teeth 92 (only three collectively labeled) that extend along trajectories that fan out about a central axis (not labeled) in a fashion similar to that of teeth 50. The pattern of teeth 92 is a mirror image of teeth 50 formed by surface 29 (see again FIG. 7) so that teeth 92 and teeth 50 mesh together. Other surface configurations are contemplated that facilitate rigid coupling of couplers 22 and 26. For example, in at least some embodiments one of surfaces 29 or 90 may form a single tooth that is receivable between two of the teeth formed on the other of the couplers to secure relative positions. In other embodiments the teeth may be replaced by relatively smooth recesses and ribs that cooperate to maintain relative positions when in contact.

Importantly, the coupling surfaces 29 and 90 have to be able to couple when gauge arm member 16 and handle ember 24 are in any of several different positions. Thus, for instance, referring to FIGS. 3 and 7, during a first seeding operation member 16 and associated second coupler 22 may be positioned such that second coupler surface 90 engages only the portion of first coupler surface 29 including teeth 50a. Similarly, during a second seeding operation member 16 and associated second coupler 22 may be positioned such that second coupler surface 90 engages only the portion of first coupler surface 29 including teeth 50b. During other seeding operations other relative juxtapositions of coupler surfaces 29 and 90 are contemplated for altering trenching depth. Thus, in the illustrated example the central axis from which the trajectories of teeth 50 and 92 fan out should be a common axis to ensure accurate registration of teeth 50 and 92 for coupling purposes.

Referring to FIG. 5, a post member 98 extends from the surface of the shaft of handle member 24 opposite second coupler 22. post member 98 has dimensions similar to post member 82 that extends from within recess 80 such that the second end of spring member 40 is receivable thereon for support and guidance.

Biasing spring 40 is generally a helical spring member. Spring 40 has a length dimension such that spring 40 is partially loaded when compressed between the facing surfaces of recess 80 and the shaft of handle member 24 with the first and second couplers 26 and 22, respectively, engaged. Thus, spring member 40 biases the couplers into engagement.

Referring now to FIGS. 1 through 5 and 7, it should be appreciated that the depth of a trench formed by disc 14 as assembly 10 is pulled through a field is easily adjustable via manipulation of handle member 24. To this end, the relative vertical positions of the lower edges of disc 14 and gauge wheel 46 are adjustable by rotating handle member 24 in a clockwise direction about axis 68 as indicated by arrow 100 in FIG. 5 and against the force of biasing spring 40 so that coupler 22 becomes decoupled from coupler 26, rotating handle member 24 and associated gauge arm member 16 about pivot axis 69 (see also FIG. 4) to a different position and then rotating handle member 24 in a counter-clockwise direction about axis 68 as indicated by arrow 102 in FIG. 5 and with the force of biasing spring 40 so that coupler 22 becomes re-coupled to coupler 26. Referring also to FIG. 4, when handle member 24 and gauge arm member 16 are rotated in a clockwise direction as indicated by arrow 104 in FIG. 4, distal end 19 of gauge arm member 16 also rotates clockwise as indicated by arrow 106 and hence gauge wheel 46 is lowered and the trench depth is reduced. Similarly, when handle member 24 and gauge arm member 16 are rotated in a counter-clockwise direction as indicated by arrow 108 in FIG. 4, distal end 19 of gauge arm member 16 also rotates counter-clockwise as indicated by arrow 110 and hence gauge wheel 46 is raised and the trench depth is increased.

Referring to FIGS. 2 through 5, when handle member 24 is rotated about rotation axis 68 and such that second coupler 22 disengaged first coupler 26, the shaft of handle member 24 is received between guide members 60 and is supported there between to reduce the force applied to members 58 during pivoting action about pivot axis 69. The sloped facing surfaces of members 60 snuggly receive the handle shaft to ensure sufficient support.

Figure 8:
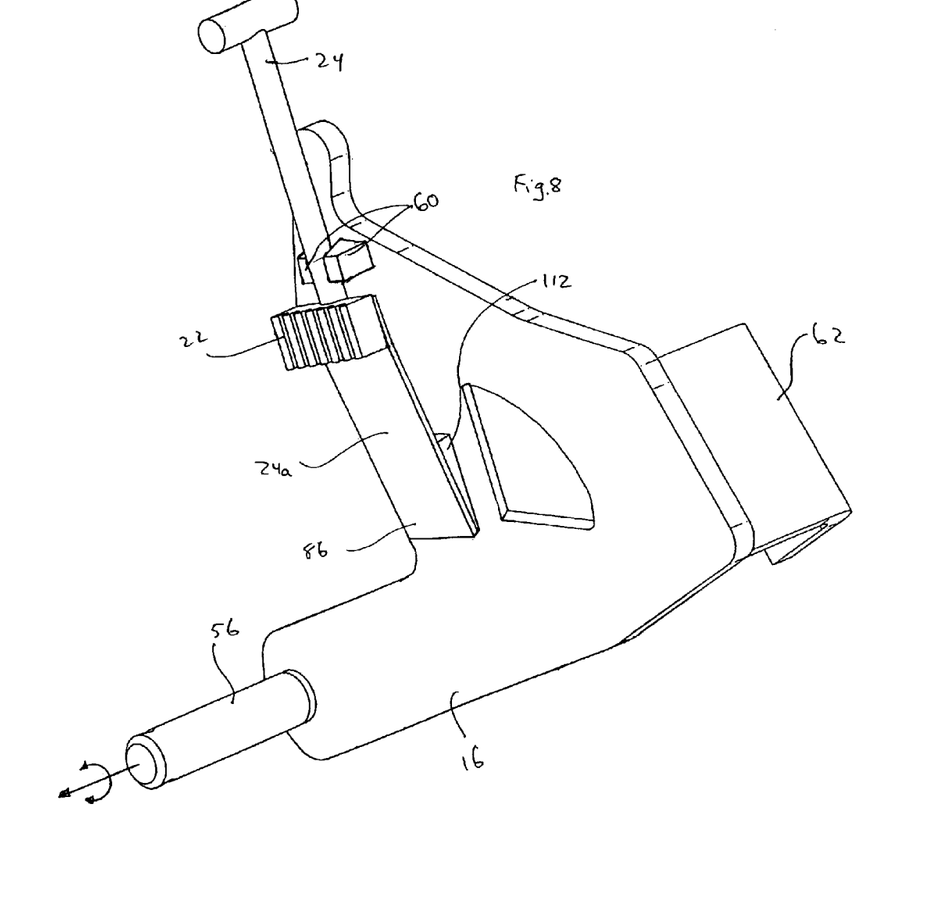
FIG. 8 is similar to FIG. 3, albeit illustrating another embodiment of the present invention.

While the invention may be susceptible to various modifications and alternative forms, specific embodiments have been shown by way of example in the drawings and have been described in herein. However, it should be understood that the invention is not intended to be limited to the particular forms disclosed. For example, FIG. 8 illustrates a portion of another inventive embodiment wherein the portion of handle member 24 between proximal end 86 and second coupler 22 is formed of a resilient steel spring member 24a that is angled away from the surface of member 16 to which it is attached by a ramp member 112. In this embodiment spring steel member 24a provides the biasing means to bias handle 24 and coupler 22 toward and into engagement with first coupler 26 (see also FIG. 7). Although not illustrated other biasing assemblies are contemplated such as, for instance, a loaded helical spring within cylinder member 70 or some type of spring or bungee member between the first and second couplers 22 and 26.

In addition, in at least some embodiments, instead of providing a biasing member to maintain the first and second couplers engaged, some type of mechanical retaining member may be provided. To this end, referring to FIG. 9, a schematic similar to the schematic of FIG. 5 described above shows one embodiment where a clip assembly 119 includes a member 120 that extends from the top edge of the coupler surface formed by second coupler to a distal end 124 and a latch member 126 that is pivotally linked to the distal end of member 120. Member 120 is dimensioned to extend past first coupler 26 when the first and second couplers are coupled. A distal end of latch member 126 forms a latching rib 130. A rear surface 132 of first coupler 26 opposite the coupling surface 29 forms a recess 122 for receiving latching rib 130. When couplers 22 and 26 are engaged and rib 130 is within recess 122, the couplers are secured in their engaging state. To decouple the couplers 22 and 26 member 126 is pivoted about end 124 and handle 24 is rotated clockwise about axis 68 as illustrated in FIG. 9. Other mechanical retaining mechanisms are contemplated.

Moreover, while the invention is described in the context of an assembly 10 where the gauge wheel 46 resides generally behind and partially laterally to one side of the disc 14, other configurations are contemplated wherein wheel 46 resided entirely behind disc 14 or to the opposite side of disc 14. Moreover, additional other wheels and assembly components may be secured to the main arm member or the gauge arm member such as, for instance, packer wheels, sensors, fertilizer tubes, etc.

Thus, the invention is to cover all modifications, equivalents, and alternatives falling within the spirit and scope of the invention as defined by the following appended claims. To apprise the public of the scope of this invention, the following claims are made:

What is claimed is:

1. A disc opener assembly connected to a tool bar linked to a vehicle for movement over the ground for opening a seed trench therein, the assembly comprising:
   a main arm member attached to the tool bar;
   a disc mounted for rotation on the main arm;
   a gauge arm member having proximal and distal ends, the proximal end mounted for pivotal motion about a pivot axis to the main arm member;
   a gauge wheel mounted to the distal end of the gauge arm member;
   a first coupler mounted to one of the main arm member and the gauge arm member;
   a second coupler linked to one of the main arm member and the gauge arm member and juxtaposed proximate and for movement with respect to the first coupler along a coupling axis that is substantially parallel to the pivot axis, the second coupler configured to engage the first coupler when biased there against; and
   a retainer for maintaining the first and second couplers engaged.

2. The assembly of claim 1 wherein the first coupler is mounted to the main arm member and the second coupler is linked to the gauge arm member.

3. The assembly of claim 2 wherein the retainer is a biasing member positioned between the gauge arm member and the second coupler to bias the second coupler toward the first coupler.

4. The assembly of claim 3 wherein the biasing member is a spring.

5. The assembly of claim 3 further including a limit member rigidly mounted to and extending from the gauge arm member, the biasing member positioned between the limit member and the second coupler.

6. The assembly of claim 5 further including a handle member having proximal and distal ends, the second coupler mounted to the handle member, the proximal end of the handle member mounted to the gauge arm member for rotation about a rotation axis that is substantially perpendicular to the pivot axis.

7. The assembly of claim 6 wherein the second coupler is mounted to the handle member substantially midway between the proximal and distal ends of the handle member.

8. The assembly of claim 7 wherein the handle member is at least one foot long.

9. The assembly of claim 6 wherein the handle member extends at least partially upward at the distal end.

10. The assembly of claim 3 wherein the biasing member includes a flexible resilient elongated member having a proximal end mounted to the gauge arm member, the second coupler mounted at a mounting point to the elongated member and spaced apart from the proximal end.

11. The assembly of claim 10 wherein the resilient member is formed of a planar piece of spring material.

12. The assembly of claim 11 further including a handle member extending form the mounting point to a distal handle end.

13. The assembly of claim 1 wherein the first coupler includes a plurality of teeth and the second coupler includes a plurality of teeth dimensioned to engage the first coupler teeth and that extend substantially along the coupling axis.

14. The assembly of claim 1 wherein the retainer includes a latch for latching the first and second couplers in a coupled configuration.

15. A disc opener assembly connected to a tool bar for movement over the ground for opening a trench therein, the assembly comprising:
   a main arm member attached to the tool bar;
   a disc mounted for rotation on the main arm;
   a gauge arm member having proximal and distal ends, the proximal end mounted for pivotal motion about a pivot axis to the main arm member;
   a gauge wheel mounted to the distal end of the gauge arm member;
   a first coupler mounted to the main arm member;
   a second coupler linked to the gauge arm member and juxtaposed proximate and for movement with respect to the first coupler along a coupling axis that is substantially parallel to the pivot axis, the second coupler configured to engage the first coupler when biased there against;
   a biasing member mounted between the gauge arm member and the second coupler for biasing the second coupler toward the first coupler; and
   a handle extending from the second coupler for moving the second coupler away from the first coupler to disengage the first and second couplers.

16. The assembly of claim 15 wherein the biasing member is a spring.

17. The assembly of claim 16 further including an extending member rigidly extending from the gauge arm member, the spring member mounted between the extending member and the second coupler.

18. The assembly of claim 17 wherein the handle member extends to a proximal end that is secured to the gauge arm member for rotation about a rotation axis that is substantially perpendicular to the pivot axis, the handle member rotatable about the rotation axis to disengage the first and second couplers.

19. The assembly of claim 18 wherein the first coupler includes a plurality of teeth and the second coupler includes a plurality of teeth dimensioned to engage the first coupler teeth and that extend substantially along the coupling axis.

20. The assembly of claim 15 wherein the biasing member includes a flexible resilient elongated member having a proximal end mounted to the gauge arm member, the second coupler mounted at a mounting point to the elongated member and spaced apart from the proximal end.

21. The assembly of claim 20 wherein the resilient member is formed of a planar piece of spring material.

* * * * *